(12) United States Patent
Autterson

(10) Patent No.: US 6,698,068 B2
(45) Date of Patent: Mar. 2, 2004

(54) QUICK RELEASE WIRE STRAP, AND METHODS OF MAKING AND USING SAME

(76) Inventor: Christopher S. Autterson, 45803 Cider Mill, Novi, MI (US) 48374

( * ) Notice: Subject to any disclaimer, the term of this patent is extended or adjusted under 35 U.S.C. 154(b) by 0 days.

(21) Appl. No.: 10/095,741

(22) Filed: Mar. 11, 2002

(65) Prior Publication Data

US 2002/0138950 A1 Oct. 3, 2002

Related U.S. Application Data

(60) Provisional application No. 60/279,804, filed on Mar. 29, 2001.

(51) Int. Cl.[7] ............................................. B65D 63/00
(52) U.S. Cl. ...................... 24/16 R; 24/16 PB; 428/40.1
(58) Field of Search .................... 24/16 R, 16 PB, 24/30.5 P, DIG. 11, 306, 442; 428/40.1, 41.1, 41.7

(56) References Cited

U.S. PATENT DOCUMENTS

| | | | | |
|---|---|---|---|---|
| 3,623,944 A | * | 11/1971 | Davis | 156/230 |
| 3,930,506 A | * | 1/1976 | Overend | 606/203 |
| 4,567,091 A | * | 1/1986 | Spector | 428/222 |
| 4,706,914 A | * | 11/1987 | Ground | 248/74.3 |
| 4,770,913 A | * | 9/1988 | Yamamoto | 428/41.9 |
| 5,219,356 A | * | 6/1993 | Harreld et al. | 606/203 |
| 5,300,171 A | * | 4/1994 | Braun et al. | 156/249 |
| 5,372,865 A | * | 12/1994 | Arakawa et al. | 428/41.5 |
| 5,695,870 A | * | 12/1997 | Kelch et al. | 428/318.4 |
| 5,827,589 A | * | 10/1998 | Autterson | 428/40.1 |
| 6,120,867 A | * | 9/2000 | Hamerski et al. | 428/40.1 |
| 6,187,126 B1 | * | 2/2001 | Rothrum et al. | 156/200 |
| 6,331,335 B1 | * | 12/2001 | Autterson | 428/40.1 |
| 6,349,452 B1 | * | 2/2002 | Cisneros | 24/306 |
| 6,349,904 B1 | * | 2/2002 | Polad | 248/74.3 |
| 6,451,398 B1 | * | 9/2002 | Sylvester | 428/41.8 |

* cited by examiner

Primary Examiner—Anthony Knight
Assistant Examiner—André L. Jackson

(57) ABSTRACT

A non-reusable quick release wire strap to retain wires, cables, and harness assemblies temporarily during transit or assembly operations. The plastic retention strap has double-coated foam tape near one end of the strap. The strap is wound around the wires to be retained, and then stuck to itself. To release the strap, a user grabs a plastic tab of the strap and pulls, thereby causing the tape to tear and ultimately to fail.

10 Claims, 1 Drawing Sheet

QUICK RELEASE WIRE STRAP, AND METHODS OF MAKING AND USING SAME

The present utility patent application is based on U.S. Provisional Patent Application Serial No. 60/279,804, and claims the benefit of the Mar. 29, 2001 filing date thereof.

The present invention relates generally to strap devices for holding wires or other components using high strength material for the strap or harness.

In particular, the present invention relates to the quick release wire strap to retain wires, cables and harness assemblies temporarily during transit or assembly operations.

BACKGROUND OF THE INVENTION

The relevant art is exemplified by the following United States Patents: Erickson U.S. Pat. No. 4,554,193; Yamamoto, U.S. Pat. No. 4,770,913; Waldenberger U.S. Pat. No. 4,839,206; Arvidsson et al. U.S. Pat. No. 5,049,445; Ness U.S. Pat. No. 5,130,185; and Madrzak et al. U.S. Pat. No. 5,212,002; and Autterson, U.S. Pat. No. 5,827,589.

None of the previous devices and techniques disclose or contemplate a quick release wire strap for retaining wires, cables and harness assemblies temporarily during transit or assembly operations.

Indeed, a desideratum of the present invention is to avoid the animadversions of the previous devices and techniques.

It would thus be desirable to provide a device which, in addition to eliminating the problems and disadvantages of the previous techniques, provides very new and desirable features.

SUMMARY OF THE INVENTION

The present invention provides a quick release wire strap, comprising: a strap; and a predetermined piece of double-coated foam tape secured to said strap at a first side of said foam tape near one end of said strap leaving a pull tab of said strap exposed at said one end of said strap.

The present invention also provides a quick release wire strap for temporarily retaining wires or other objects, comprising: a strap; and a predetermined piece of double-coated foam tape secured at a first side of said tape near one end of said strap leaving a pull tab of strap exposed at said one end of said strap; said strap being wrapped around said wires or other objects, and then stuck to a second side of foam tape which is remote from said first side of said foam tape; and said strap being released by pulling said pull tab causing said foam tape to tear.

The present invention further provides a novel and unique non-reusable quick release wire strap for temporarily retaining wires, cables, harness assemblies, or other external objects during transit or assembly operations, comprising: an elongated, substantially flat plastic strap having first and second parallel major surfaces; a predetermined piece of double-coated foam tape having first and second parallel major surfaces; said predetermined piece of double-coated foam tape being secured to said strap at said first major surface of said double-coated foam tape to said first major surface of said elongated substantially flat plastic strap near a first end of said strap leaving a pull tab of said strap exposed at said first end of said strap; said strap being wrapped around said wires, cables, harness assemblies, or other external objects so that said second major surface of said strap is facing outwardly, and then said strap is affixed to said second major surface of said double-coated foam tape which is remote from said first major surface of said foam tape; and said strap being released from said wires, cables, harness assemblies, or other external objects by pulling said pull tab causing said foam tape to tear and ultimately to fail.

It is an object of the present invention to provide a quick release wire strap as described hereinabove to retain wires, cables and harness assemblies during transit or assembly operations.

Another object of the present invention is to provide a quick release wire strap as described hereinabove wherein the strap comprises a plastic retention strap with double-coated foam tape near one end thereof.

Another object of the present invention is to provide a method of using the quick release wire strap as described hereinabove wherein the plastic strap is wrapped around the wires to be retained and then stuck to itself, and then the strap is released by grabbing the plastic pull tab and pulling thereby causing the foam to tear, and ultimately to fail, to release the strap.

Another object of the present invention is to provide a quick release wire strap as described hereinabove which is not reusable.

Other objects, advantages and applications of the present invention will become apparent to those skilled in the art when the accompanying description of the best mode contemplated for practicing the invention is read in conjunction with the accompanying drawings.

DESCRIPTION OF SOME PREFERRED EMBODIMENTS OF THE PRESENT INVENTION

Figure 1:
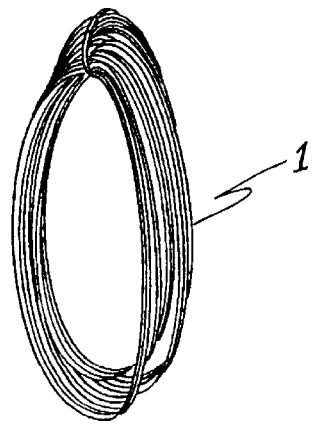
FIG. 1 illustrates a quick release wire strap according to the present invention shown in a coiled unused condition.

Referring to FIG. 1, there is shown the quick release wire strap 1 in accordance with the present invention shown in a coiled condition prior to its being used.

Figure 2:
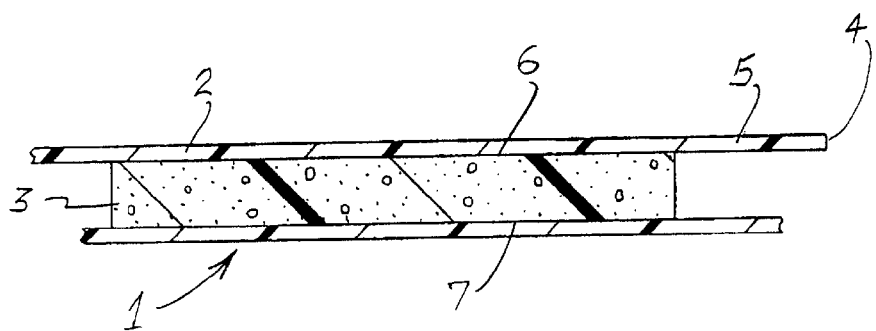
FIG. 2 illustrates a cross-sectional view of the quick release wire strap in accordance with the present invention depicting how the retention strap is stuck to itself on the double-coated foam tape.

With reference to FIGS. 1 and 2, the quick release wire strap 1 includes a plastic retention strap 2 having a predetermined piece of double-coated foam tape 3 secured to the plastic retention strap 2 near a first end 4 of the strap 2. The foam tape 3 is provided in such a position as to leave a pull tab 5 near said first end 4 of the retention strap 2. Preferably, but not necessarily, the pull tab 5 should have a linear dimension of approximately one-half inch.

The plastic retention strap 2 should preferably, but not necessarily, be fabricated from high density polyethylene.

The foam tape 3 is affixed at a first surface 6 thereof to the plastic retention strap 2. The opposite surface 7, that is the second side of the foam tape 3, is normally initially provided with a liner (not shown).

In use, the plastic strap 2 is wound around the wires, cables and harness assemblies or other objects to be retained, and then stuck to itself by pressing the plastic retention strap 2 against the second surface 7 of the double-coated foam tape. This enables the quick release wire strap 1 to retain wires, cables and harness assemblies temporarily, especially during transit or assembly operations.

Figure 3:
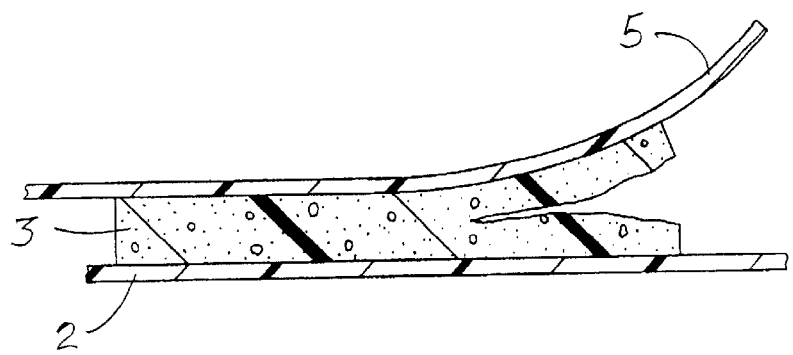
FIG. 3 depicts the FIG. 2 embodiment showing the tearing process of the double-coated foam tape when the tab is pulled for releasing the strap.

In order to release the strap 1, the user would grab the plastic pull tab 5 and pull same. This causes a tearing of the foam tape 3, as illustrated in FIG. 3, with ultimate failure of the foam tape 3 and release of the strap 1. Thus, it is apparent that the present invention provides a quick release wire strap which is not reusable.

While the foregoing has described the features and advantages of a preferred embodiment of the present invention, it will be apparent to those skilled in this particular area of technology and to others after having been exposed to the present patent application that changes in form, dimensions, materials and proportions and minor details of construction may be resorted to without departing from the spirit of the invention and the patent claims set forth hereinbelow.

What is claimed is:

1. A non-reusable quick release wire strap for temporarily retaining wires, cables, harness assemblies, or other external objects during transit or assembly operations, comprising:
    an elongated, substantially flat plastic strap having first and second parallel major surfaces;
    a predetermined piece of double-coated foam tape having first and second parallel major surfaces;
    said predetermined piece of double-coated foam tape being secured at said first major surface of said double-coated foam tape to said first major surface of said elongated substantially flat plastic strap near a first end of said strap leaving a pull tab of said strap exposed at said first end of said strap;
    said strap being wrapped around said wires, cables, harness assemblies, or other external objects so that said second major surface of said strap is facing outwardly, and then said strap is affixed to said second major surface of said double-coated foam tape which is remote from said first major surface of said foam tape; and
    said strap being released from said wires, cables, harness assemblies, or other external objects by pulling said pull tab causing said foam tape to tear and ultimately to fail.

2. A non-reusable quick release wire strap according to claim 1, wherein:
    said elongated, substantially flat plastic strap is fabricated from high density polyethylene.

3. A non-reusable quick release wire strap comprising:
    a strap for releasably holding one or more wires;
    a predetermined piece of double-coated foam tape secured to said strap at a first side of said foam tape near one end of said strap leaving a pull tab of said strap exposed at said one end of said strap;
    said strap is wrapped around one or more wires, and then stuck to a second side of foam tape which is remote from said first side of said foam tape; and
    said strap being released by pulling said pull tab causing said foam tape to tear.

4. A quick release wire strap according to claim 3, wherein:
    said strap comprises a plastic retention strap.

5. A quick release wire strap according to claim 3, wherein:
    said strap is fabricated from high density polyethylene.

6. A quick release wire strap according to claim 5, wherein:
    said strap comprises a plastic retention strap.

7. A non-reusable quick release wire strap for temporarily retaining wires or other objects, comprising:
    a strap;
    a predetermined piece of double-coated foam tape secured to said strap at a first side of said tape near one end of said strap leaving a pull tab of strap exposed at said one end of said strap;
    said strap being wrapped around said wires or other objects, and then stuck to a second side of foam tape which is remote from said first side of said foam tape; and
    said strap being released by pulling said pull tab causing said foam tape to tear.

8. A quick release wire strap according to claim 7, wherein:
    said strap is fabricated from high density polyethylene.

9. A quick release wire strap according to claim 7, wherein:
    said strap comprises a plastic retention strap.

10. A quick release wire strap according to claim 9, wherein:
    said strap is fabricated from high density polyethylene.

* * * * *